Sept. 24, 1940.     K. H. BENTON     2,215,996
METHOD OF ELECTRICALLY INSULATING A CONDUCTOR
Filed Aug. 31, 1937
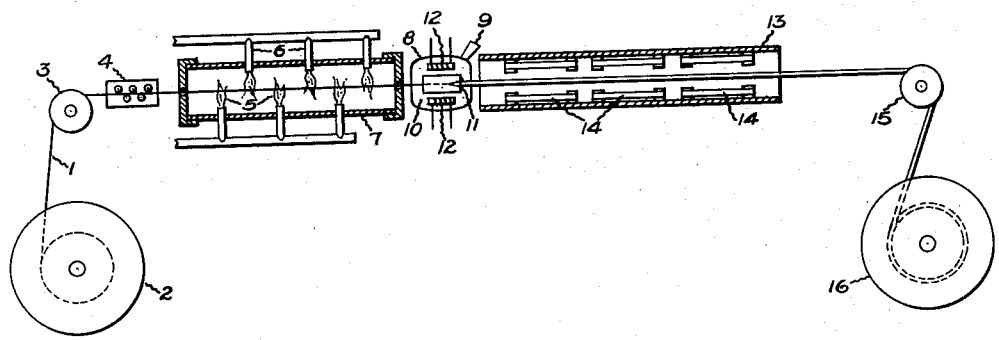
Inventor:
Kenneth H. Benton,
by Harry E. Dunham
His Attorney.

Patented Sept. 24, 1940

2,215,996

UNITED STATES PATENT OFFICE 2,215,996

METHOD OF ELECTRICALLY INSULATING A CONDUCTOR

Kenneth H. Benton, Pittsfield, Mass., assignor to General Electric Company, a corporation of New York Application August 31, 1937, Serial No. 161,764

2 Claims. (Cl. 18—59)

This invention relates to a method of electrically insulating a conductor with resinous compositions and, more particularly, with resinous compositions of the class produced by condensing an aldehyde with a product of hydrolysis of a polyvinyl ester.

The resinous compositions of the type referred to above are described, generally, in Reissue Patent No. 20,430, Morrison et al., and, as pointed out in said patent, may be produced from various aldehydes and various polyvinyl esters. In the following description of the invention and in the appended claims this class of resins is designated, generally, as "polyvinylal resins."

It is an object of this invention to provide a rapid, economical and effective method for electrically insulating a conductor, such as plain or tinned copper wire, with a continuous uniform film or coating of polyvinylal resin without dissolving said resin in a solvent.

The novel features which are characteristic of my invention are set forth in the appended claims. The invention itself, however, will best be understood from reference to the following more detailed description when considered in connection with the accompanying drawing in which the single figure shows schematically apparatus which may be used in carrying this invention into effect.

In order that those skilled in the art better may understand the kind of resin with which conductors are insulated in accordance with the present invention, the following description illustrative of the preparation of a polyvinylal resin is given:

One hundred parts of a polymerized vinyl acetate is dissolved in 185 parts of glacial acetic acid. To this is added 83 parts of an aqueous solution of formaldehyde, containing 37½ per cent of formaldehyde, and a suitable amount of mineral acid, for example 6.8 parts of concentrated sulfuric acid. All proportions herein mentioned are by weight. Hydrolysis is carried out at about 70° C. in an enameled vessel. Samples of the reaction mixture are removed at suitable intervals of time and analyzed for their formaldehyde content. The results of analyses indicate the extent to which the polyvinyl ester has been converted into polyvinyl formal. When the desired degree of conversion has been effected, a suitable amount of a neutralizing agent, for example 13 parts of concentrated ammonia, is added to the reaction vessel. The neutralized mass is poured as a thin stream into water, whereupon the reaction product is precipitated in the form of threads. The thread-like material is washed with water and dried in a current of warm (60° C.) air. The dried threads are white, or nearly so.

Aldehydes other than formaldehyde may be used in making polyvinylal resins, for example, acetaldehyde, propionic aldehyde, butyric aldehyde, benzaldehyde and the like. Likewise polyvinyl esters other than polyvinyl acetate may be employed, for instance polyvinyl propionate, polyvinyl butyrate and the like. The properties of polyvinylal resins may be varied through a wide range by varying the viscosity and the extent of hydroylsis of the polyvinyl ester, the amount and the character of the aldehyde reacted with the hydrolyzed vinyl ester, and the character and the amount of the acid catalyst used.

It has been found that polyvinylal resins decompose upon heating in air or oxygen, giving off volatile products among which, in the case of polyvinyl formal, formaldehyde, formic acid and other organic acids, carbon dioxide and water have been identified. The decomposition is accomplished by shrinkage and discoloration of the material and also, depending upon time and temperature conditions, by its partial or complete conversion to infusible, insoluble state. In view of these characteristic properties it has been thought heretofore that wires could not be insulated uniformly and effectively by extruding solvent-free, non-aqueous polyvinylal resin in heated plastic state about a wire. It has therefore been common practice to dissolve the polyvinylal resin in a suitable solvent and to coat the wire by passing it a number of times through a bath of the resin solution, heating the coated wire after each passage through the bath to harden the coating thereon.

The present invention provides a method of insulating wires with a coating of polyvinylal resin of the desired thickness in a single application of the resin to the wire, thereby saving time. Further, the expense of solvents is eliminated and heating costs are reduced. This invention also makes possible polyvinylal resin coatings on wire in thicknesses (for example, 40 mils) that are commercially impractical to obtain by coating a wire with polyvinylal resin in solution state.

I shall now describe my invention with reference to the accompanying drawing. As shown in the single figure of this drawing, a wire I is drawn from a pay-off reel 2 over a guide sheave 3 by any suitable driving means (not shown). After passing through a wire-straightening device 4, the wire preferably is preheated by passing it through a heated zone such as a gas-fired or electrically heated oven. Or, as shown in the drawing, the wire may be preheated by passing it through one or more gas burner flames 5 of gas burners 6. The gas flames may be enclosed in a chamber 7 adjoining, or in close proximity to an extrusion mechanism designated generally by the numeral 8, and which may be of any suitable type adapted to extrude or otherwise to apply and to form under pressure a continuous uniform covering of polyvinylal resin on a wire. The hopper 9 provides means for supplying the polyvinylal resin from the exterior to the interior of the extrusion device through which the resin is conveyed to the extrusion head 10 and the die 11. Suitable means, for example electric heating elements 12, are provided for heating the polyvinylal resin to convert it to plastic state and for maintaining it during application to the wire within a predetermined temperature range. Upon entering the head 10 the wire passes through the die 11 where the hot plastic resin is applied. The exit opening of the die 11 may be adjusted to provide a coating of any desired thickness on the wire. The wire with its uniform coating of polyvinylal resin thereon then may be passed, as hereinafter will be more fully described, through a suitably heated zone. Such zone may comprise, for example, an oven 13 which may be heated electrically or by combustion gases, or by any other suitable means, and which for purpose of illustration is shown as being heated by means of the electrical heating units 14. The coated wire then is passed over the guide sheave 15 to the take-up reel 16.

The temperature of the polyvinylal resin as it is applied to the wire is important. If too low a temperature is employed, mechanical difficulties are encountered in applying the material to the wire. If too high a temperature is used, a partial hardening of the resin in the extrusion head 10 and the die 11 may take place, with resultant difficulties not only in applying the material but also in obtaining uniform coatings free from defects. More specifically it may be stated that a polyvinylal resin which is a product of condensing formaldehyde with a product of hydrolysis of polyvinyl acetate, known under the trade name of "Formvar," and which may be so prepared that it has an incipient softening point of, for instance, 160° to 180° C., should be heated to, and maintained substantially between the temperature range of 185° to 250° C. while applying and forming the same upon wire. Preferably such a polyvinylal resin is maintained within a temperature range of 200° to 225° C. during its extrusion. Polyvinylal resins having incipient softening points higher or lower than that of the resin above-mentioned may require heating in correspondingly higher or lower temperatures in order to attain optimum extrusion conditions. The temperature to which different polyvinylal resins should be heated during extrusion therefore should be predetermined.

The heated, plastic polyvinylal resin may be applied to wire that is traveling, for example, 5 to 300 feet or more per minute. The rate of wire travel is coordinated with the extruding speed of the extrusion mechanism 8, and varies with the size of the wire, the thickness of the coating applied thereto, temperatures employed and other influencing factors.

The bare wire entering the extrusion head 10 preferably is preheated, for instance within the temperature range of 100° to 250° C. Advantageously the wire is preheated to approximately the same temperature to which the polyvinylal resin is heated during extrusion. If the wire is not preheated the extruded insulating coating of resin thereon may lack adequate flexibility, form cracks upon bending, and tend to become brittle and shrink, leaving holes in the surface, upon being subjected to sudden rises in temperature. By preheating the wire the adhesion of the resin coating to the wire is improved. Further, an insulating film produced by extruding a polyvinylal resin upon a preheated wire, and hardening the composition in place on the wire, has adequate flexibility through a temperature range of 0° to 150° C.

In addition to preheating the bare wire it is also sometimes desirable to modify the applied film, for example by passing the coated wire through a heated atmosphere before being exposed to room temperature. For example, the coated wire immediately after it leaves the extrusion device may be passed through a heated chamber such as the electrically heated oven 13, which is maintained at a temperature of, for instance, 200° to 400° C., depending upon the length of the heated zone, the speed at which the wire is passed therethrough, the thickness of the wire coating, the heating effect desired and other influencing factors. In accordance with a preferred embodiment of the invention, the coated wire usually will not be heated to a temperature materially exceeding that of the resin during extrusion, and in general will be brought to a somewhat lower temperature. Such heat treatment of the coated wire is beneficial in that, for example, it relieves strains that may be imparted to the coating during its formation upon the wire. However, the described heat treatment is not always necessary and often may be omitted, for instance when the wire is preheated to temperatures approximating that to which the polyvinylal resin is heated during extrusion. In such case the applied polyvinylal resin is allowed to harden in place on the wire as the coated wire passes at room temperature to the take-up reel 16.

Quite surprisingly it was found that when an after-heat treatment is given the resin-coated conductor, it is not necessary to preheat the wire to such high temperatures, and wire-preheating temperatures as low as, for example, 100° to 150° C. then may be employed. By certain modifications of the after-heat treatment, for instance by prolonging the after-heat treatment or using somewhat higher temperatures during such treatment, it is possible for certain applications of the insulated wire to eliminate the preheating step and to extrude the polyvinylal resin upon nonpreheated wire. In general, however, most effective and practically satisfactory results are obtained when the wire is preheated.

If for certain applications of the insulated wire it is desirable partly or completely to convert the resin film to the infusible insoluble state, the coated wire may be heated to a temperature materially above that at which the polyvinylal resin is applied to the bare wire. For instance, the coated wire may be heated to a temperature within the range of 275° to 350° C. Of course it will be understood that in such heat treatment there is a time-temperature relationship, and that temperatures outside the range just mentioned by way of illustration may be used, providing the time of heating is increased or decreased accordingly.

In carrying this invention into effect it is important that the wire be clean, that it be free from metallic or other dust as well as grease or oil films. The presence of dust is objectionable in that it may result in perforation of the applied film. If the wire is oily or greasy, the resin film adheres poorly to the wire and may result in bubbles of gas being trapped therein.

In general, somewhat better and more uniform results are obtained, and difficulties which may occur during extrusion of hot, plastic polyvinylal resin are obviated or minimized, by using a polyvinylal resin which is modified as described and claimed in the co-pending application of Birger W. Nordlander and Robert E. Burnett, Serial No. 161,796, filed concurrently herewith, and assigned to the same assignee as the present invention.

As pointed out in the aforesaid co-pending Nordlander and Burnett application, polyvinylal resins advantageously may have incorporated therewith for extrusion applications a relatively small proportion, for example from 0.1 to 2.0 per cent by weight of the whole, of a substance which retards the conversion of the resin from plastic state to infusible insoluble state during extrusion at an elevated temperature such, for instance, as within the range of 185° to 250° C. This class of substances hereinafter is designated, generally, as "retarders". Any suitable amount of retarder may be intimately associated with a polyvinylal resin, but no material gain ordinarily is had with the use of more than 2.0 per cent. Examples of retarders which may be incorporated with polyvinylal resins to facilitate extrusion of such resins are phenolic bodies such as phenol, resorcinol, catechol, hydroquinine, pyrogallol, phloroglucinol, alpha- and beta-naphthol, and the like; substituted phenols such, for instance, as cresols, xylenols, carvacrol, thymol, para-tertiary butyl phenol, para-tertiary amyl phenol, para-phenyl phenol, ortho-hydroxymethyl phenol (saligenin), 2, 4-diamyl phenol and the like; aliphatic primary, secondary and tertiary amines such as ethyl, propyl, butyl, amyl, hexyl, heptyl, octyl and higher members of the homologous series, and mixed aliphatic amines such as methyl amyl, ethyl hexyl, iso-propyl butyl amines and the like; substituted aliphatic amines such as mono-, di-, and triethanol amines, and the like; aliphatic polyamines such as ethylene diamine, tri- and tetramethylene diamines, and the like; aromatic primary, secondary and tertiary amines such as phenyl, naphthyl, naphthyl phenyl, biphenyl (more correctly designated as the biphenylyl group) amines and substitution products of such amines; mixed amines such as benzyl amine; and combinations of the above-mentioned aromatic and aliphatic amines, for example ethyl naphthyl amine, diphenyl methyl amine and the like. Preferred retarders are those which either have high boiling characteristics or are solid at normal room temperatures.

Retarders such as above described obviate the objectionable effects of oxygen on a polyvinylal resin at elevated extrusion temperatures. It is believed that the advantages accruing from the use of such substances result mainly from their barring oxygen from the points of the resin molecules which are vulnerable to attack by oxygen. In addition these materials may produce a beneficial effect in other ways. For example, when a basic substance such as an amine is used, it may neutralize occluded acidic materials present in polyvinylal resin as commercially prepared and may neutralize any acidic decomposition products of the resin that may be formed. Or, if retarders of either the amino or phenolic types are employed, any aldehyde decomposition products of polyvinylal resin may react with such retarder to form a non-volatile resinous composition which itself has a stabilizing effect upon polyvinylal resin in the same way as do the retarders themselves.

As further pointed out in the aforesaid copending Nordlander and Burnett application, the retarder may be incorporated in any suitable manner with polyvinylal resin during its manufacture or with the finished resin in solid state. For instance, the retarder, if normally a solid, may be dissolved in a suitable volatile solvent therefor. Depending upon the solubility characteristics of the retarder, the solvent employed may be, for example, water, methyl or ethyl alcohol, acetone, ethyl ether, acetal, etc. The retarder then may be deposited from solution on the solid resin. The mass is thereafter heated to remove the solvent. Liquid retarders may be mixed with a diluent of lower boiling point and the diluted solution then may be applied to the solid resin. The diluent is then evaporated. In such ways a more uniform deposition of the retarder on the resin is obtained.

The retarded or the non-retarded solvent-free, non-aqueous polyvinylal resin may contain other materials as it is applied to a conducting core. For example, it may contain dyes or suitable plasticizers. Examples of such plasticizers are dibutyl phthalate, diamyl phthalate, butyl tartrate, tricresyl phosphate, benzyl benzoate, triacetin, tripropionin, etc.

Advantage may be taken of the exceptional toughness of the hardened film of polyvinylal resin in reinforcing conventionally enameled wire against abrasion. In such case a coating of polyvinylal resin may be extruded upon the wire with its coating of regular enamel thereon in the same manner and using about the same preheating, extruding and after-heating temperatures during the process as have been described with reference to the coating of a bare conductor. Of course it is to be understood that other layers of conventional electrical insulation may be applied to wire insulated in accordance with this invention.

Electrically insulated copper wires have been manufactured in accordance with this invention with a polyvinylal resin extruded continuously upon the wire in uniform wall thicknesses of from 2 to 40 mils. Insulated conductors produced as hereinbefore described show practically the same physical and electrical characteristics as do conductors insulated as disclosed in Patent No. 2,085,995, Patnode and Flynn, which patent is assigned to the same assignee as the present invention. The hardened insulating coating is tough, flexible, of high dielectric strength and low power factor. It is also remarkably abrasion-resistant and resistant to attack by such agencies as oil and the like. Such resistance characteristics are somewhat more pronounced when the coated wire is so heated as to convert the resin film thereon to infusible insoluble state.

What I claim as new and desire to secure by Letters Patent of the United States is:

1. The method of providing a wire with a continuous, uniform, flexible electrically insulating covering comprising a polyvinylal resin produced by condensing formaldehyde with a product of hydrolysis of polyvinyl ester and characterized by normally converting to the infusible insoluble state under extrusion time and temperature conditions, said method consisting in heating the bare wire within the temperature range of 185° to 250° C. thereby to improve the adhesion to the wire of a subsequently applied coating of the said resin and to improve the flexibility of the resin film on the finished insulated wire, extruding upon the thus heated wire a continuous, uniform covering of the said polyvinylal resin having incorporated therein a relatively small proportion of an amine, said amine suppressing the conversion of the said resin to the insoluble infusible state during extrusion, and heating the thus modified resin during extrusion at approximately the same temperature to which the wire is heated.

2. A method of manufacturing wire which is electrically insulated with a continuous, uniform, flexible covering of a polyvinylal resin produced by condensing formaldehyde with a product of hydrolysis of polyvinyl acetate and characterized by normally converting to the infusible insoluble state under extrusion time and temperature conditions, said method consisting in heating the bare wire within the temperature range of 200° to 225° C. thereby to improve the adhesion to the wire of a subsequently applied coating of the said resin and to improve the flexibility of the resin film on the finished insulated wire, extruding upon the thus heated wire a continuous, uniform covering of the said polyvinylal resin having incorporated therein from 0.1 to 2.0 per cent by weight of the whole of an amine effective in suppressing the conversion of the said resin to the insoluble infusible state during extrusion, and heating the thus modified resin during extrusion at approximately the same temperature to which the wire is heated.

KENNETH H. BENTON.